(12) United States Patent
Komatsu et al.

(10) Patent No.: US 9,500,825 B2
(45) Date of Patent: Nov. 22, 2016

(54) OPTICAL MODULE

(71) Applicant: Oclaro Japan, Inc., Kanagawa (JP)

(72) Inventors: Kazuhiro Komatsu, Tokyo (JP);
Takuma Ban, Kanagawa (JP);
Fumitoshi Goto, Kanagawa (JP);
Yoichiro Igarashi, Tokyo (JP)

(73) Assignee: OCLARO JAPAN, INC., Kanagawa (JP)

( * ) Notice: Subject to any disclaimer, the term of this patent is extended or adjusted under 35 U.S.C. 154(b) by 0 days.

(21) Appl. No.: 15/054,816

(22) Filed: Feb. 26, 2016

(65) Prior Publication Data

US 2016/0259138 A1 Sep. 8, 2016

(30) Foreign Application Priority Data

Mar. 6, 2015 (JP) ................................. 2015-044641

(51) Int. Cl.
*G02B 6/12* (2006.01)
*G02B 6/42* (2006.01)
*G02B 6/44* (2006.01)

(52) U.S. Cl.
CPC ........... *G02B 6/4281* (2013.01); *G02B 6/4284* (2013.01); *G02B 6/444* (2013.01)

(58) Field of Classification Search
CPC .................. H01L 2924/00; H01L 2924/00014; G02B 6/43; G02B 6/4214
USPC .................................. 385/14, 15, 31, 39, 135
See application file for complete search history.

(56) References Cited

U.S. PATENT DOCUMENTS 7,030,477 B2 * 4/2006 Ishimura ............. H01S 5/02212
257/664
8,380,080 B2 * 2/2013 Kawaguchi .......... H05K 1/0234
398/135

FOREIGN PATENT DOCUMENTS

JP 2012-047823 A 3/2012

* cited by examiner

*Primary Examiner* — Jennifer Doan
(74) *Attorney, Agent, or Firm* — Mattingly & Malur, PC

(57) ABSTRACT

A flexible wiring board includes a conductive film provided on one surface of a substrate. The conductive film includes a plurality of pad portions to which a plurality of connection electrodes are respectively bonded with solder, and a wiring portion extending in a direction crossing a row in which the plurality of pad portions are arranged. The plurality of pad portions include a terminal portion electrically connected with the wiring portion, and at least two land portions located on both sides of the terminal portion while avoiding electrical connection to the wiring portion. The solder includes land solder portions respectively overlaid on the at least two land portions and a terminal solder portion overlaid on the terminal portion. The land solder portion has a shape extending longer than the terminal solder portion along a direction in which the wiring portion extends from the connection electrode corresponding thereto.

8 Claims, 10 Drawing Sheets

OPTICAL MODULE

CROSS-REFERENCE TO RELATED APPLICATION

The present application claims priority from Japanese application JP2015-044641 filed on Mar. 6, 2015, the content of which is hereby incorporated by reference into this application.

BACKGROUND OF THE INVENTION

1. Field of the Invention

The present invention relates to an optical module.

2. Description of the Related Art

An optical sub-assembly (OSA) that converts an electric signal to an optical signal and vice versa is mounted in a transmitter-receiver device (also referred to as a transceiver) for optical fiber transmission. It is known to use a flexible wiring board for electrically connecting the optical sub-assembly with a main substrate or the like. JP 2012-047823 A discloses the structure in which the flexible wiring board is connected to the optical sub-assembly as described above.

The optical sub-assembly includes a plurality of connection electrodes including lead pins and a circuit pattern of a feedthrough. The plurality of connection electrodes are arranged on a line in many cases. Wires formed on the flexible wiring board include a plurality of connection terminals including pads and through holes. The connection electrodes of the optical sub-assembly and the connection terminals of the flexible wiring board are bonded together with solder, whereby a plurality of solder bonding portions are formed. When the plurality of connection electrodes are arranged on a line, the plurality of solder bonding portions are also arranged on a line. Therefore, when the flexible wiring board is bent, the wire is easily bent at a position adjacent to the solder bonding portion which is hard, and thus stress is concentrated. In order to prevent disconnection, it is desired to avoid the concentration of stress described above.

SUMMARY OF THE INVENTION

It is an object of the invention to avoid the concentration of stress on a wire when a flexible wiring board is bent.

(1) An optical module according to an aspect of the invention includes: an optical sub-assembly for converting an electric signal and an optical signal at least from one to the other; a flexible wiring board; and solder electrically connecting the optical sub-assembly with the flexible wiring board, wherein the optical sub-assembly includes a plurality of connection electrodes arrayed so as to be arranged in at least a row, the flexible wiring board includes a substrate having flexibility and a conductive film provided on one surface of the substrate, the conductive film includes a plurality of pad portions to which the plurality of connection electrodes are respectively bonded with the solder and a wiring portion extending in a direction crossing a row in which the plurality of pad portions are arranged, the plurality of pad portions include a terminal portion electrically connected with the wiring portion and at least two land portions located on both sides of the terminal portion while avoiding electrical connection to the wiring portion, the solder includes land solder portions respectively overlaid on the at least two land portions and a terminal solder portion overlaid on the terminal portion, and the land solder portion has a shape extending longer than the terminal solder portion along a direction in which the wiring portion extends from the connection electrode corresponding thereto. According to the aspect of the invention, since the land solder portion has the shape extending longer than the terminal solder portion, a wire is hard to bend at a position adjacent to the terminal solder portion. Due to this, the concentration of bending stress on the wire can be prevented, and therefore, a disconnection countermeasure is taken. Here, the phrase "converting an electric signal and an optical signal at least from one to the other" includes the case where an electric signal is converted to an optical signal, the case where an optical signal is converted to an electric signal, and the case where an electric signal is converted to an optical signal and the optical signal is converted to an electric signal.

(2) In the optical module according to (1), each of the at least two land portions may have a shape extending longer than the terminal portion along the direction in which the wiring portion extends from the connection electrode corresponding thereto.

(3) In the optical module according to (1) or (2), the flexible wiring board may further include a protective film covering the wiring portion, next to an edge of the land solder portion in the direction in which the land solder portion extends longer than the terminal solder portion.

(4) In the optical module according to any one of (1) to (3), the plurality of pad portions may be arranged in each of a first row and a second row parallel to each other, and the wiring portion electrically connected to the terminal portion located in the first row and the wiring portion electrically connected to the terminal portion located in the second row may extend in opposite directions.

(5) In the optical module according to any one of (1) to (4), the flexible wiring board may further include a second conductive film provided on a surface of the substrate on the side opposite to the surface on which the conductive film is provided, the second conductive film may include a land pattern portion and a planar pattern portion extending in a shape avoiding the land pattern portion, the land pattern portion may be electrically connected with the terminal portion, and the planar pattern portion may be electrically connected with the at least two land portions.

(6) In the optical module according to (5), the flexible wiring board may include a plurality of through holes penetrating the substrate to achieve electrical connection between front and back surfaces of the substrate, and the plurality of through holes may include a through hole penetrating the terminal portion and the land pattern portion to achieve electrical connection and through holes penetrating the respective at least two land portions and the planar pattern portion to achieve electrical connection.

(7) In the optical module according to (6), the solder may also be provided inside the plurality of through holes, on the land pattern portion, and on the planar pattern portion.

(8) In the optical module according to (6) or (7), each of the plurality of connection electrodes may be a lead pin, and the lead pin may be inserted through each of the plurality of through holes.

DETAILED DESCRIPTION OF THE INVENTION

Hereinafter, embodiments of the invention will be described with reference to the drawings.

First Embodiment

Figure 1:
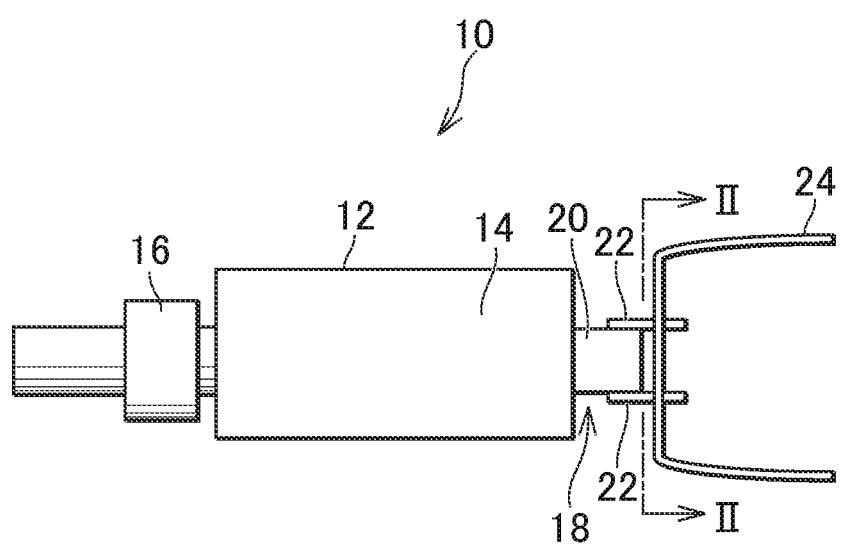
FIG. 1 is a diagram for explaining an optical module according to a first embodiment of the invention.

FIG. 1 is a diagram for explaining an optical module according to a first embodiment of the invention. The optical module 10 includes an optical sub-assembly 12. Examples of the optical sub-assembly 12 include: an optical transmission module (transmitter optical sub-assembly (TOSA)) that includes a light-emitting element such as a laser therein, coverts an electric signal to an optical signal, and transmits the optical signal to an optical fiber connected with an optical connector 16; an optical receiver module (receiver optical sub-assembly (ROSA)) that includes a light-receiving element represented by a photodiode therein, and converts an optical signal received through the optical connector to an electric signal; and a bidirectional optical sub-assembly (BOSA) having the functions of the TOSA and the ROSA. As described above, the optical sub-assembly is configured to convert an electric signal and an optical signal at least from one to the other. The optical sub-assembly 12 is provided with a feedthrough 18 for transmitting or/and receiving an electric signal in a state where the hermeticity of a package 14 is maintained.

Figure 2:
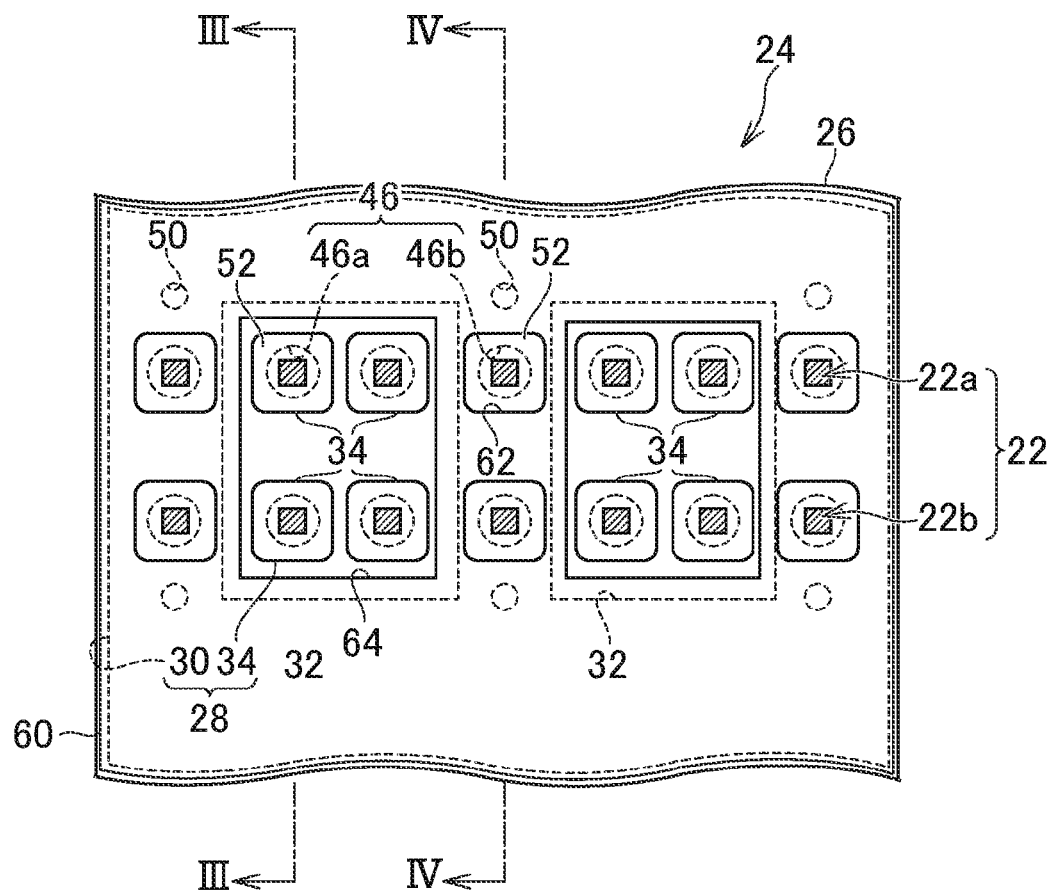
FIG. 2 is a cross-sectional view of the optical module shown in FIG. 1, taken along the line II-II.

FIG. 2 is a cross-sectional view of the optical module 10 shown in FIG. 1, taken along the line II-II. The feedthrough 18 includes a ceramic substrate 20 and a plurality of connection electrodes 22 (for example, lead pins). The plurality of connection electrodes 22 are arrayed so as to be arranged in at least a row. The plurality of connection electrodes 22 shown in FIG. 2 are arranged in two rows (that is, plural rows), and include connection electrodes 22a in a first row, which are arranged in a row in the lateral direction on the upper stage, and connection electrodes 22b in a second row, which are arranged in a row in the lateral direction on the lower stage.

Figure 3:
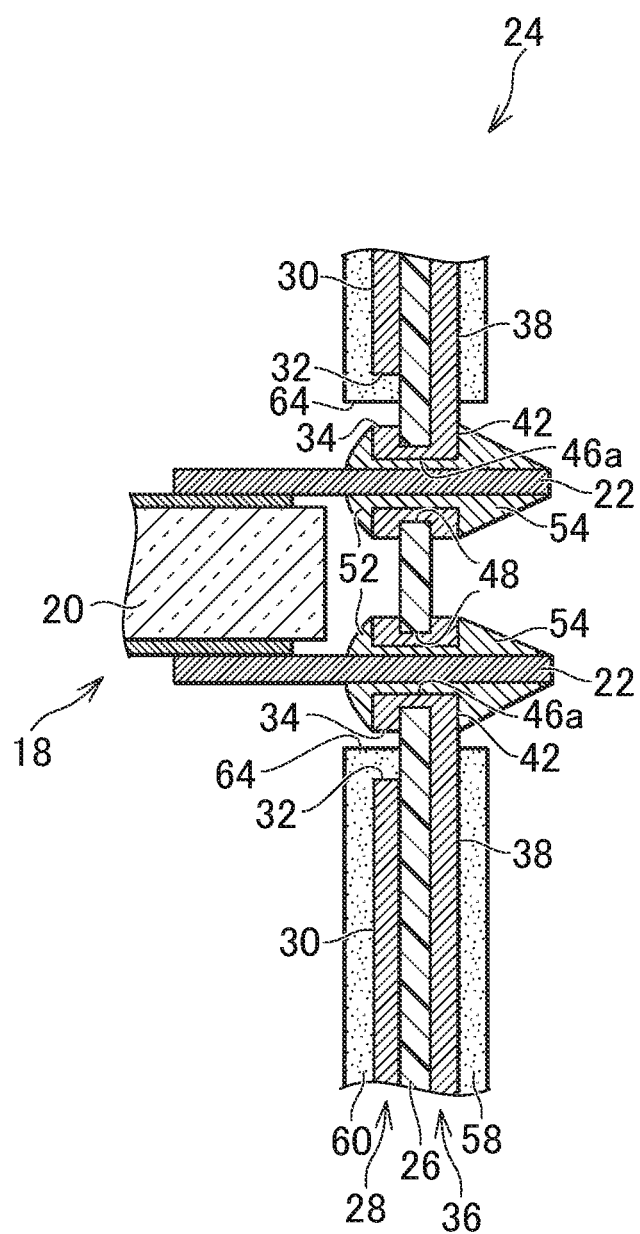
FIG. 3 is a cross-sectional view of the optical module shown in FIG. 2 or 5, taken along the line III-III.
Figure 4:
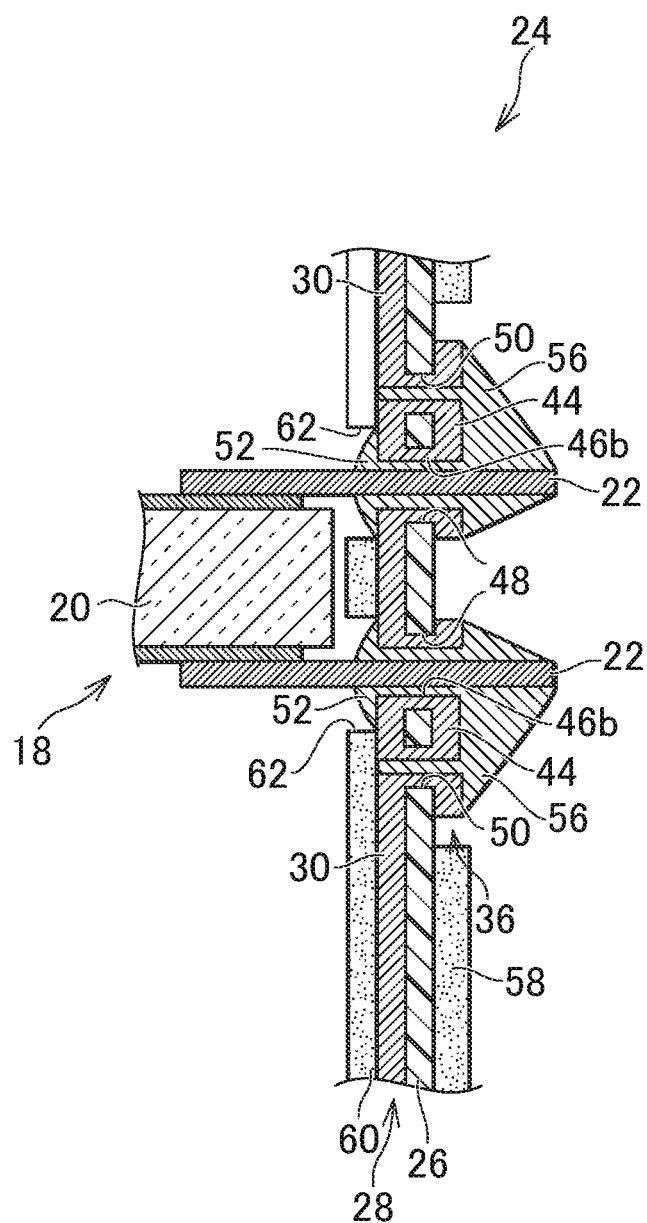
FIG. 4 is a cross-sectional view of the optical module shown in FIG. 2 or 5, taken along the line IV-IV.

FIG. 3 is a cross-sectional view of the optical module 10 shown in FIG. 2, taken along the line III-III. FIG. 4 is a cross-sectional view of the optical module 10 shown in FIG. 2, taken along the line IV-IV. The optical module 10 includes a flexible wiring board 24. The flexible wiring board 24 includes a substrate 26 having flexibility. A conductive film 28 is provided on one surface of the substrate 26. The conductive film 28 includes a planar pattern portion (solid pattern) extending in a plane (see FIG. 2).

The planar pattern portion 30 includes at least one (for example, a plurality of) opening(s) 32. At least one (for example, a plurality of) land pattern portion(s) 34 is/are disposed inside one opening 32. The conductive film 28 includes the land pattern portion 34, and the planar pattern portion 30 extends in a shape avoiding the land pattern portion 34. The land pattern portion 34 is not electrically connected with the planar pattern portion 30, and a plurality of land pattern portions 34 are not electrically connected with each other.

Figure 5:
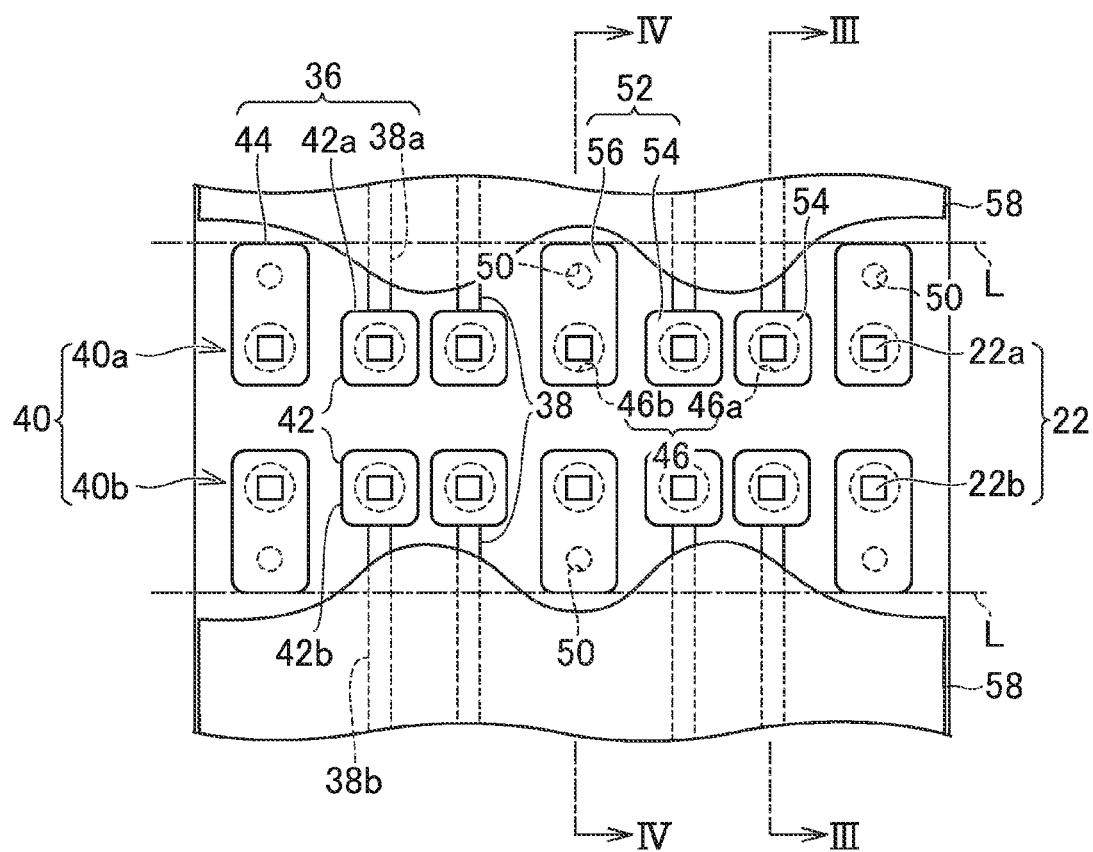
FIG. 5 is a diagram showing the opposite side of the optical module shown in FIG. 2.

FIG. 5 is a diagram showing the opposite side of the optical module 10 shown in FIG. 2. FIG. 3 is also a cross-sectional view of the optical module 10 shown in FIG. 5, taken along the line III-III, and FIG. 4 is also a cross-sectional view of the optical module 10 shown in FIG. 5, taken along the line IV-IV.

As shown in FIGS. 3 to 5, a conductive film 36 is provided on the other surface (surface on the side opposite to the surface on which the conductive film 28 shown in FIG. 2 is provided) of the substrate 26. The conductive film 36 includes a plurality of wiring portions 38. Each of the plurality of wiring portions 38 is a transmission path for performing transmission and/or receiving of electric signals between the optical sub-assembly 12 and a main substrate (not shown). In general, the plurality of wiring portions 38 are used for transmission of high frequencies or electric signals of a direct current (DC) line such as a power supply line, while the planar pattern portion 30 is used as a ground pattern (grounding conductor) in many cases. Especially when the wiring portion 38 is used for transmission of high frequencies, there is a fear of disconnection due to the concentration of stress in bending because the wiring portion 38 has a narrow width for characteristic reasons compared with other wires.

As shown in FIG. 5, the conductive film 36 includes a plurality of pad portions 40. The plurality of pad portions 40 are arrayed so as to be arranged in at least a row. The plurality of pad portions 40 shown in FIG. 5 are arranged in two rows (that is, plural rows), and include pad portions 40a in a first row, which are arranged in a row in the lateral direction on the upper stage, and pad portions 40b in a second row, which are arranged in a row in the lateral direction on the lower stage. That is, the plurality of pad portions 40 are arranged in each of the first row and the second row parallel to each other.

The plurality of pad portions 40 include terminal portions 42 electrically connected with the wiring portions 38. One wiring portion 38 and one terminal portion 42 are electrically connected. However, one wiring portion 38 and a plurality of terminal portions 42 may be electrically connected, a plurality of wiring portions 38 and one terminal portion 42 may be electrically connected, or a plurality of wiring portions 38 and a plurality of terminal portions 42 may be electrically connected.

The wiring portion 38 extends in a direction (the vertical direction in FIG. 5) crossing the row (the lateral direction in FIG. 5) in which the plurality of pad portions 40 are arranged. Wiring portions 38a electrically connected with terminal portions 42a located in the first row extend upward in FIG. 5, while wiring portions 38b electrically connected with terminal portions 42b located in the second row extend downward in FIG. 5. That is, the extending directions are opposite.

The plurality of pad portions 40 include at least two land portions 44 located on both sides of the terminal portion 42 while avoiding electrical connection to the wiring portion 38. One group of pad portions 40 arranged in each of the rows includes a pair of land portions 44 and at least one (for example, a plurality of) terminal portion(s) 42 disposed therebetween.

The land portion 44 (specifically, the surface shape thereof) has a shape extending longer than the terminal portion 42 (specifically, the surface shape thereof) along the direction in which the wiring portion 38 extends. The land portion 44 and the terminal portion 42 arranged in each of the rows are configured such that the sides of the land portion 44 and the terminal portion 42 on the side opposite to the side on which the wiring portion 38 is connected are aligned on a line. The land portion 44 extends longer than the terminal portion 42 on the side on which the wiring portion 38 is connected to the terminal portion 42.

As shown in FIG. 3, the terminal portion 42 and the land pattern portion 34 are disposed at positions at least partially overlapping each other, with the substrate 26 interposed therebetween. As shown in FIG. 4, the land portion 44 and the planar pattern portion 30 are disposed at positions at least partially overlapping each other, with the substrate 26 interposed therebetween.

The flexible wiring board 24 includes a plurality of through holes 46 penetrating the substrate 26 to achieve electrical connection between the front and back surfaces thereof. The through hole 46 includes a conductor provided, by plating or the like, on the inner surface of a through hole 48 of the substrate 26, and can be used also as a hole through which a component is inserted. The through hole 46 can be formed of the same material as the conductive film 28 and the conductive film 36 and formed simultaneously therewith.

The plurality of through holes 46 include through holes 46a each penetrating the terminal portion 42 and the land pattern portion 34, which are located at the positions overlapping each other, to achieve electrical connection, whereby the terminal portion 42 and the land pattern portion 34 are electrically connected. The plurality of through holes 46 include through holes 46b each penetrating the land portion 44 and the planar pattern portion 30, which are located at the positions overlapping each other, to achieve electrical connection, whereby at least two land portions and the planar pattern portion 30 are electrically connected.

As shown in FIGS. 4 and 5, the land portion 44 and the planar pattern portion 30 are joined together such that the material (conductor) constituting the land portion 44 and the planar pattern portion 30 is continuously and integrally put in a hole (via) 50 formed in the substrate 26. Due to this, the peeling-off of the land portion 44 is prevented.

The plurality of connection electrodes 22 (lead pins) of the optical sub-assembly 12 are respectively inserted through the plurality of through holes 46. As shown in FIG. 5, the land portion 44 has the shape extending longer than the terminal portion 42 along the direction in which the wiring portion 38 extends from the inserted connection electrode 22 (lead pin).

The optical module 10 includes solder 52 that electrically connects the optical sub-assembly 12 (specifically, the connection electrodes 22) with the flexible wiring board 24 (specifically, the terminal portions 42 and the planar pattern portion 30). The solder 52 is also provided inside the plurality of through holes 46 to fix the connection electrodes 22 inserted through the through holes 46 therein.

As shown in FIG. 2, the solder 52 is provided on (the entire surfaces of) the land pattern portions 34 and on (some areas of) the planar pattern portion 30. Moreover, as shown in FIG. 5, the solder 52 includes terminal solder portions 54 overlaid on the terminal portions 42 (the entire surfaces) and land solder portions 56 overlaid on the land portions 44 (the entire surfaces). The land solder portion 56 has a shape extending longer than the terminal solder portion 54 along the direction in which the wiring portion 38 extends from the connection electrode 22 corresponding thereto. Therefore, since the land solder portion 56 is hard to bend due to its hardness, the wiring portion 38 is hard to bend at a position adjacent to the terminal solder portion 54. Due to this, since the concentration of bending stress on the wiring portion 38 can be prevented, a disconnection countermeasure is taken.

As shown in FIG. 5, a protective film 58 is provided, so as to cover the wiring portion 38, next to the edge (at the position of the line L) of the land solder portion 56 in a direction in which the land solder portion 56 extends longer than the terminal solder portion 54. The protective film 58 is made of a material having flexibility such as polyimide resin. When the flexible wiring board 24 is bent, the bending place starts from a portion next to the edge (that is, the position of the line L) of the land solder portion 56 extending longer than the terminal solder portion 54 because the area in which the solder is disposed is hard. In that case, since the wiring portion 38 is covered with the protective film 58 at the position of the line L, stress occurring in the wiring portion 38 is dispersed, and thus the disconnection thereof can be prevented. As described above, the wiring portion 38 may have a narrow wiring width especially when used for the transmission of high frequencies, and the embodiment of the invention especially has an advantageous effect.

As shown in FIG. 2, the planar pattern portion 30 is covered with a protective film 60. As shown in FIG. 4, the protective film 60 includes holes 62, inside each of which the through hole 46b penetrating the planar pattern portion 30 is disposed. The hole 62 is larger than the through hole 46, which allows the solder 52 to be provided inside the hole 62. As shown in FIG. 3, the protective film 60 includes openings 64, and the land pattern portions 34 are disposed inside the opening 64. That is, the protective film 60 is provided while avoiding the land pattern portions 34.

Second Embodiment

Figure 6:
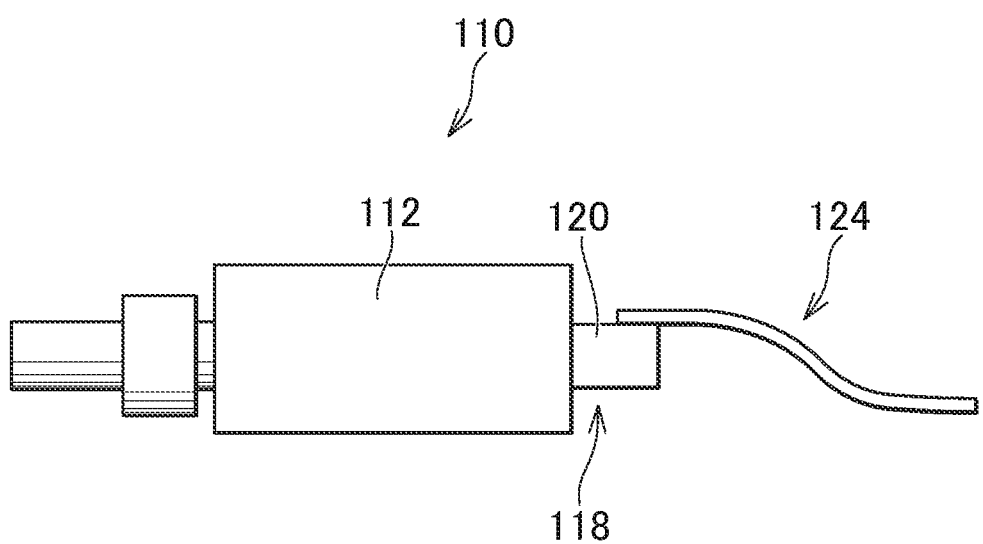
FIG. 6 is a side view showing an optical module according to a second embodiment of the invention.

FIG. 6 is a side view showing an optical module 110 according to a second embodiment of the invention. The optical module 110 includes an optical sub-assembly 112. The optical sub-assembly 112 is provided with a feedthrough 118. The details of the optical sub-assembly 112 correspond to the content described in the first embodiment.

Figure 7:
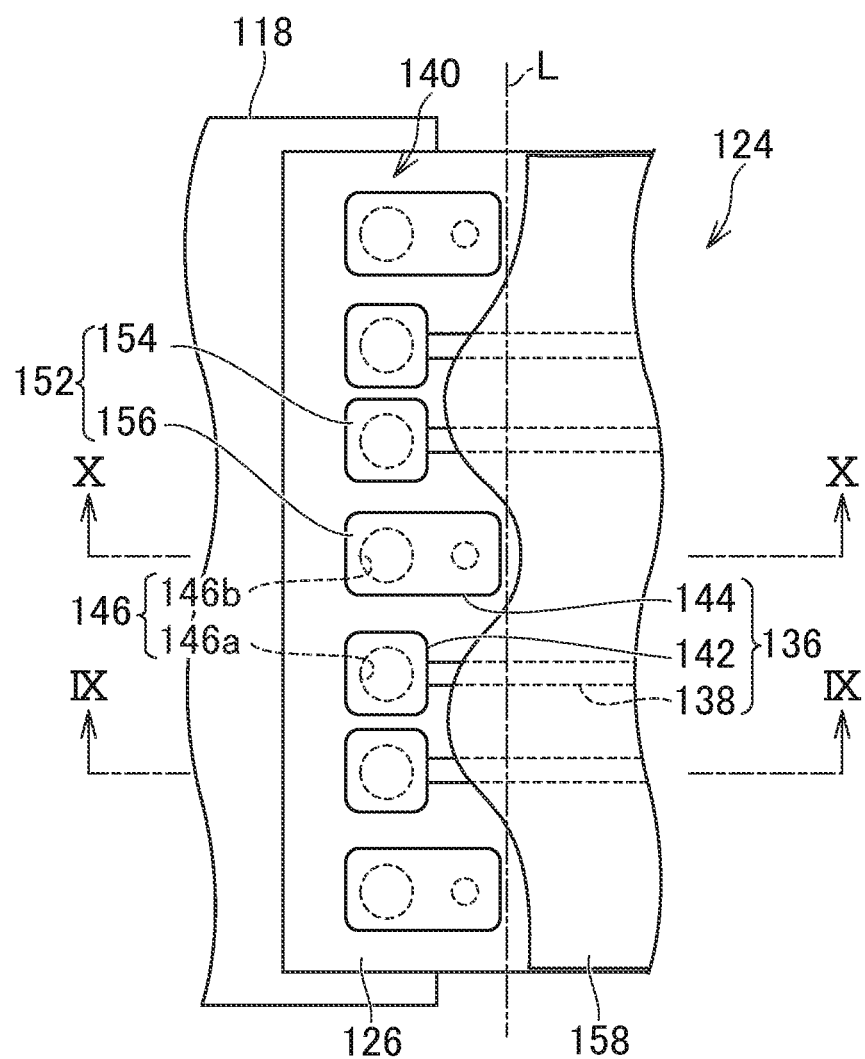
FIG. 7 is a plan view of the optical module shown in FIG. 6.
Figure 8:
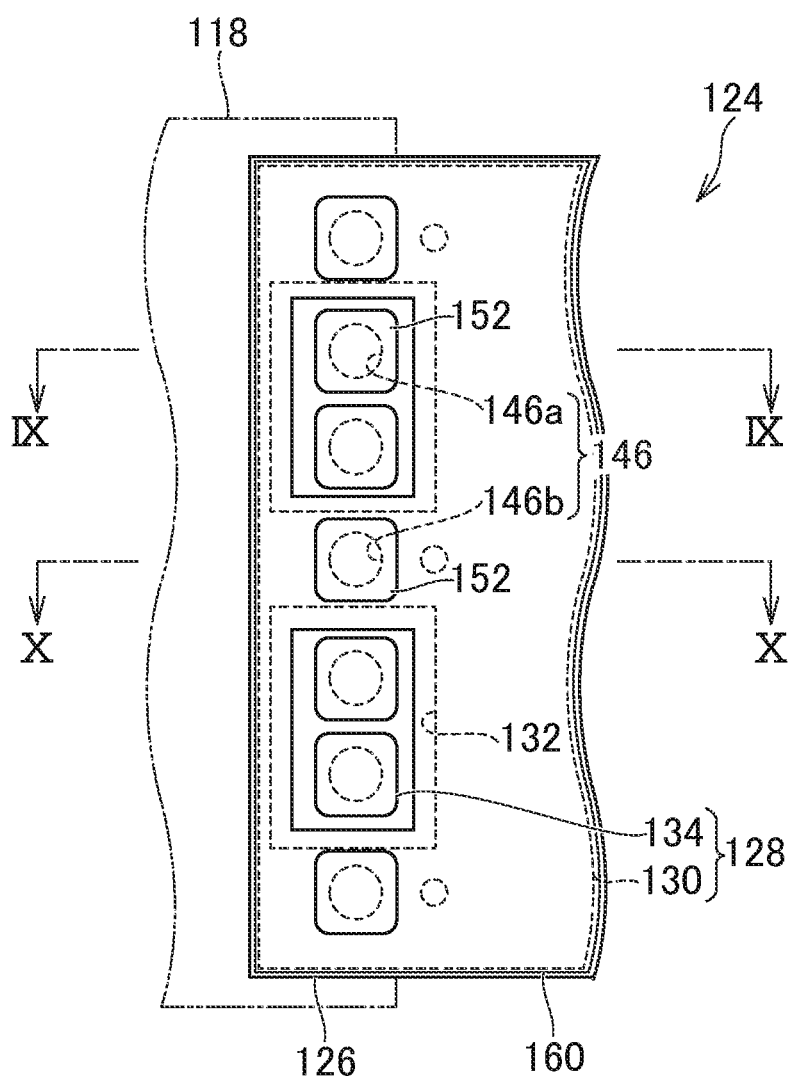
FIG. 8 is a bottom plan view showing the opposite side of the optical module shown in FIG. 7.
Figure 9:
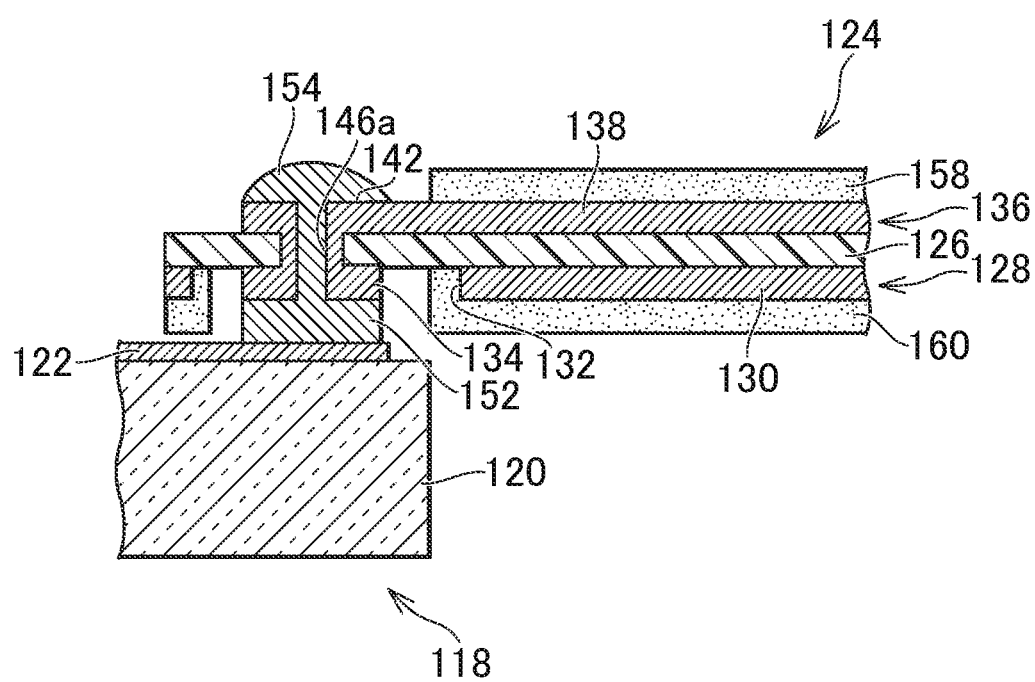
FIG. 9 is a cross-sectional view of the optical module shown in FIG. 7 or 8, taken along the line IX-IX.
Figure 10:
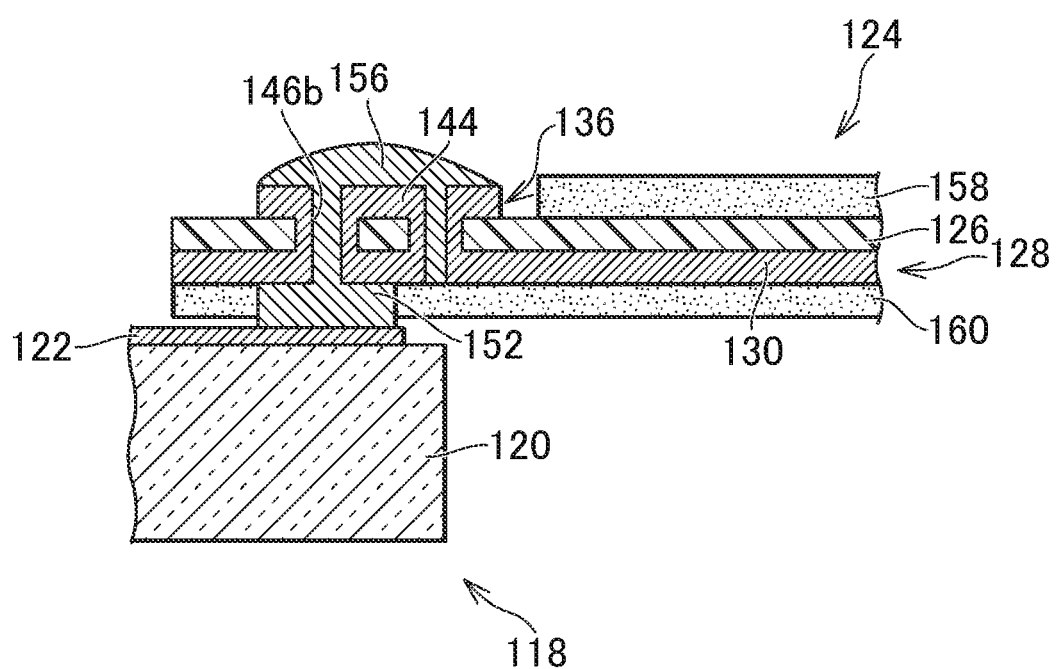
FIG. 10 is a cross-sectional view of the optical module shown in FIG. 7 or 8, taken along the line X-X.

FIG. 7 is a plan view of the optical module 110 shown in FIG. 6. FIG. 8 is a bottom plan view showing the opposite side of the optical module 110 shown in FIG. 7. FIG. 9 is a cross-sectional view of the optical module 110 shown in FIG. 7 or 8, taken along the line IX-IX. FIG. 10 is a cross-sectional view of the optical module 110 shown in FIG. 7 or 8, taken along the line X-X.

As shown in FIG. 9 or 10, the feedthrough 118 includes a plurality of connection electrodes 122. The connection electrode 122 is a terminal of a wiring pattern provided on a ceramic substrate 120. The plurality of connection electrodes 122 are arrayed so as to be arranged only in a row. A flexible wiring board 124 electrically connected to the feedthrough 118 includes a substrate 126 having flexibility.

As shown in FIG. 7, a conductive film 136 is provided on one surface (surface facing opposite to the feedthrough 118) of the substrate 126. The conductive film 136 includes a plurality of wiring portions 138. The details of the wiring portion 138 (especially the extending direction) correspond to the content described in the first embodiment. The conductive film 136 includes a plurality of pad portions 140. The plurality of pad portions 140 are arrayed so as to be arranged only in a row. The plurality of pad portions 140 include terminal portions 142 electrically connected with the wiring portions 138. The plurality of pad portions 140 include at least two land portions 144 located on both sides of the terminal portion 142 while avoiding electrical connection to the wiring portion 138. The details of the conductive film 136 (especially the terminal portion 142 and the land portion 144) correspond to the content described in the first embodiment.

As shown in FIG. 8 (which is a bottom plan view viewed from the opposite side of FIG. 7 and in which the feedthrough 118 is shown by the imaginary line), a conductive film 128 is provided on the other surface (surface facing the feedthrough 118) of the substrate 126. The conductive film 128 includes a planar pattern portion 130 (solid pattern) extending in a plane. At least one (for example, a plurality of) land pattern portion(s) 134 is/are disposed inside each of openings 132 of the planar pattern portion 130. The details of the conductive film 128 (especially the planar pattern portion 130 and the land pattern portion 134) correspond to the content described in the first embodiment.

The flexible wiring board 124 includes a plurality of through holes 146 penetrating the substrate 126 to achieve electrical connection between the front and back surfaces thereof. The plurality of through holes 146 include through holes 146a each penetrating the terminal portion 142 and the land pattern portion 134, which are located at positions overlapping each other, to achieve electrical connection, whereby the terminal portion 142 and the land pattern portion 134 are electrically connected. The plurality of through holes 146 include through holes 146b each penetrating the land portion 144 and the planar pattern portion 130, which are located at positions overlapping each other, to achieve electrical connection, whereby the land portion 144 and the planar pattern portion 130 are electrically connected. The other details of the through hole 146 correspond to the content described in the first embodiment.

The optical module 110 includes solder 152 that electrically connects the optical sub-assembly 112 (specifically, the connection electrodes 122) with the flexible wiring board 124 (specifically, the terminal portions 142 and the planar pattern portion 130). Specifically as shown in FIGS. 9 and 10, the solder 152 is present between the plurality of connection electrodes 122 and the conductive film 128 (plural places of the planar pattern portion 130 and the plurality of land pattern portions 134). As shown in FIG. 8, the solder 152 is provided on the entire surfaces of the land pattern portions 134 and portions of the surface of the planar pattern portion 130. In an assembly process, the flexible wiring board 124 is disposed on the feedthrough 118, and the solder 152 can be provided through the plurality of through holes 146 from the side opposite to the feedthrough 118. As a result, the solder 152 is also provided inside the through hole 146 (see FIGS. 9 and 10).

As shown in FIG. 7, the solder 152 includes terminal solder portions 154 overlaid on the terminal portions 142 (the entire surfaces) and land solder portions 156 overlaid on the land portions 144 (the entire surfaces). The land solder portion 156 has a shape extending longer than the terminal solder portion 154 along a direction in which the wiring portion 138 extends from the connection electrode 122 corresponding thereto. Therefore, since the land solder portion 156 is hard to bend due to its hardness, the wire is hard to bend at a position adjacent to the terminal solder portion 154. Due to this, the concentration of bending stress on the wire can be prevented, and therefore, a disconnection countermeasure is taken.

As shown in FIG. 7, a protective film 158 is provided, so as to cover the wiring portion 138, next to the edge (at the position of the line L) of the land solder portion 156 in a direction in which the land solder portion 156 extends longer than the terminal solder portion 154. The protective film 158 is made of a material having flexibility such as polyimide resin. When the flexible wiring board 124 is bent at the position of the line L, stress occurring in the wiring portion 138 is dispersed due to the protective film 158, and thus the disconnection of the wiring portion 138 can be prevented. As shown in FIG. 8, the planar pattern portion 130 is covered with a protective film 160.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module comprising:
   an optical sub-assembly for converting an electric signal and an optical signal at least from one to the other;
   a flexible wiring board; and
   solder electrically connecting the optical sub-assembly with the flexible wiring board, wherein
   the optical sub-assembly includes a plurality of connection electrodes arrayed so as to be arranged in at least a row,
   the flexible wiring board includes a substrate having flexibility and a conductive film provided on one surface of the substrate,
   the conductive film includes a plurality of pad portions to which the plurality of connection electrodes are respectively bonded with the solder and a wiring portion extending in a direction crossing a row in which the plurality of pad portions are arranged,
   the plurality of pad portions include a terminal portion electrically connected with the wiring portion and at least two land portions located on both sides of the terminal portion while avoiding electrical connection to the wiring portion,
   the solder includes land solder portions respectively overlaid on the at least two land portions and a terminal solder portion overlaid on the terminal portion, and
   the land solder portion has a shape extending longer than the terminal solder portion along a direction in which the wiring portion extends from the connection electrode corresponding thereto.

2. The optical module according to claim 1, wherein each of the at least two land portions has a shape extending longer than the terminal portion along the direction in which the wiring portion extends from the connection electrode corresponding thereto.

3. The optical module according to claim 1, wherein the flexible wiring board further includes a protective film covering the wiring portion, next to an edge of the land solder portion in the direction in which the land solder portion extends longer than the terminal solder portion.

4. The optical module according to claim 1, wherein the plurality of pad portions are arranged in each of a first row and a second row parallel to each other, and the wiring portion electrically connected to the terminal portion located in the first row and the wiring portion electrically connected to the terminal portion located in the second row extend in opposite directions.

5. The optical module according to claim 1, wherein
the flexible wiring board further includes a second conductive film provided on a surface of the substrate on the side opposite to the surface on which the conductive film is provided,
the second conductive film includes a land pattern portion and a planar pattern portion extending in a shape avoiding the land pattern portion,
the land pattern portion is electrically connected with the terminal portion, and
the planar pattern portion is electrically connected with the at least two land portions.

6. The optical module according to claim 5, wherein
the flexible wiring board includes a plurality of through holes penetrating the substrate to achieve electrical connection between front and back surfaces of the substrate, and
the plurality of through holes include a through hole penetrating the terminal portion and the land pattern portion to achieve electrical connection and through holes penetrating the respective at least two land portions and the planar pattern portion to achieve electrical connection.

7. The optical module according to claim 6, wherein
the solder is also provided inside the plurality of through holes, on the land pattern portion, and on the planar pattern portion.

8. The optical module according to claim 6, wherein
each of the plurality of connection electrodes is a lead pin, and
the lead pin is inserted through each of the plurality of through holes.

* * * * *